United States Patent
Egedal et al.

(10) Patent No.: US 9,133,828 B2
(45) Date of Patent: Sep. 15, 2015

(54) METHOD AND SYSTEM FOR DETERMINING A MASS CHANGE AT A ROTATING BLADE OF A WIND TURBINE

(75) Inventors: Per Egedal, Herning (DK); Hans Laurberg, Arhus C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 299 days.

(21) Appl. No.: 13/638,623

(22) PCT Filed: Jun. 15, 2010

(86) PCT No.: PCT/EP2010/058333
§ 371 (c)(1),
(2), (4) Date: Oct. 1, 2012

(87) PCT Pub. No.: WO2011/127990
PCT Pub. Date: Oct. 20, 2011

(65) Prior Publication Data
US 2013/0031966 A1    Feb. 7, 2013

(30) Foreign Application Priority Data

Apr. 12, 2010  (EP) .................................. 10159626

(51) Int. Cl.
  *G01M 15/00*  (2006.01)
  *F03D 11/00*  (2006.01)
  *F03D 7/04*   (2006.01)

(52) U.S. Cl.
  CPC ............ *F03D 11/0025* (2013.01); *F03D 7/042* (2013.01); *F05B 2260/80* (2013.01); *F05B 2260/96* (2013.01); *F05B 2270/303* (2013.01); *F05B 2270/326* (2013.01); *F05B 2270/334* (2013.01); *Y02E 10/722* (2013.01); *Y02E 10/723* (2013.01)

(58) Field of Classification Search
  CPC . F03D 7/042; F03D 11/0025; F05B 2260/80; F05B 2270/334; F05B 2270/303; F05B 2260/96; F05B 2270/326; Y02E 10/722; Y02E 10/723
  USPC .......................... 73/112.01, 865, 660; 416/61
  See application file for complete search history.

(56) References Cited

U.S. PATENT DOCUMENTS

| | | | |
|---|---|---|---|
| 7,086,834 B2 * | 8/2006 | LeMieux | 416/1 |
| 8,109,722 B2 * | 2/2012 | Gamble et al. | 416/1 |
| 8,186,950 B2 * | 5/2012 | Benito et al. | 416/39 |
| 2005/0276696 A1 | 12/2005 | LeMieux | |
| 2008/0141768 A1 | 6/2008 | Hoffrogge | |
| 2008/0206052 A1 | 8/2008 | Volkmer | |
| 2009/0246019 A1 * | 10/2009 | Volanthen et al. | 416/1 |
| 2009/0266160 A1 | 10/2009 | Jeffrey | |
| 2012/0055247 A1 * | 3/2012 | Gonzalez Castro | 73/455 |

(Continued)

FOREIGN PATENT DOCUMENTS

| | | |
|---|---|---|
| DE | 10065314 B4 | 8/2007 |
| DE | 102006032387 A1 | 1/2008 |

(Continued)

*Primary Examiner* — J M Saint Surin (57) ABSTRACT

A method for determining a mass change at a rotating blade of a wind turbine is provided. The method includes measuring a vibration quantity representative of a vibration of the wind turbine, measuring an azimuthal quantity representative of a rotation angle of the blade, determining a frequency quantity representative of a vibration frequency of the blade from the vibration quantity and the azimuthal quantity, and determining the mass change at the blade based on the frequency quantity.

16 Claims, 3 Drawing Sheets

(56) References Cited

U.S. PATENT DOCUMENTS

| | | | |
|---|---|---|---|
| 2012/0076651 A1* | 3/2012 | Laurberg | 416/1 |
| 2012/0207589 A1* | 8/2012 | Fridthjof | 415/121.3 |
| 2013/0187383 A1* | 7/2013 | Esbensen et al. | 290/44 |

FOREIGN PATENT DOCUMENTS

| | | | |
|---|---|---|---|
| DE | 202008006322 U1 | | 7/2008 |
| EP | 1936186 A2 | | 6/2008 |
| EP | 1959134 A2 | | 8/2008 |
| EP | 1978246 A1 | | 10/2008 |
| EP | 2112375 A2 | | 10/2009 |
| EP | 1748185 B1 | | 5/2012 |
| JP | 2006071482 | * | 3/2006 |
| WO | WO 02053910 A1 | | 7/2002 |
| WO | WO 2008046215 A1 | | 4/2008 |
| WO | WO 2009000787 A2 | | 12/2008 |

* cited by examiner

METHOD AND SYSTEM FOR DETERMINING A MASS CHANGE AT A ROTATING BLADE OF A WIND TURBINE

CROSS REFERENCE TO RELATED APPLICATIONS

This application is the US National Stage of International Application No. PCT/EP2010/058333, filed Jun. 15, 2010 and claims the benefit thereof. The International Application claims the benefits of European Patent Office application No. 10159626.0 EP filed Apr. 12, 2010. All of the applications are incorporated by reference herein in their entirety.

FIELD OF INVENTION

The present invention relates to a method and to a system for determining a mass change at a rotating blade of a wind turbine. In particular, the present invention relates to a method and to a system for determining a mass change at a rotating blade of a wind turbine, wherein the mass change is determined based on a frequency of the blade.

ART BACKGROUND

US 2008/0141768 discloses ice detection for a wind turbine, wherein a wind velocity is measured with an anemometer.

US 2005/0276696 discloses methods and an apparatus for rotor blade ice detection, wherein meteorological conditions are monitored and wherein a parameter that varies with the mass of a rotor blade or a mass imbalance between the rotor blades is monitored.

WO 02/053910 discloses a method and a device for monitoring the state of rotor blades on wind turbines, wherein a rotor blade immanent sensor is used to identify a damage on the rotor blade.

US 2008/0206052 discloses a method and a device for monitoring the state of rotor blades on wind power installations, wherein a displacement sensor is arranged on the rotor blade.

EP 1 959 134 discloses a method and a system for utilizing lateral tower acceleration to detect asymmetric icing, wherein a determination whether a rotor-mass imbalance exists is performed.

EP 1 936 186 discloses a wind turbine and a method of detecting asymmetric icing on a wind turbine, wherein it is determined, whether a rotor-mass imbalance condition exists utilizing longitudinal tower acceleration data. Hereby, a rotor speed acceleration monitoring system is utilized.

EP 1 748 185 discloses an icing detection system for a wind turbine, wherein a digital structural vibration sensor measures a vibrational condition or a load condition of the wind turbine and delivers the measurement data to a detection means which is adapted to detect an icing condition on the basis of the mechanical variable data provided by the structural vibration sensor.

There may be a need for a method and a system for determining a mass change, in particular an icing condition, at a rotating blade of a wind turbine which is capable of determining an icing condition in a more accurate manner and which is capable of determining the icing condition in a simplified way. In particular, there may be a need for a method and a system for determining a mass change, in particular an icing condition, at a rotating blade of a wind turbine, which can easily be used or installed or performed in an existing wind turbine without requiring major structural modifications or adaptations. Further, there may be a need for a method and a system for determining a mass change, in particular an icing condition, at a rotating blade of a wind turbine which is reliable and cost-effective.

SUMMARY OF THE INVENTION

This need may be met by the subject matter according to the independent claims. Advantageous embodiments of the present invention are described by the dependent claims.

According to an embodiment a method for determining a mass change at a rotating blade of a wind turbine is provided, wherein the method comprises measuring a vibration quantity representative of a vibration of the wind turbine; measuring an azimuthal quantity representative of a rotation angle of the blade; determining a frequency quantity representative of a vibration frequency of the blade from the vibration quantity and the azimuthal quantity; determining the mass change at the blade based on the frequency quantity.

The method may in particular be utilized for determining an icing condition at the blade of the wind turbine. The measured vibration quantity may for example comprise an acceleration, an oscillation, a movement, a lateral movement, a vertical movement, a rotational movement of the wind turbine, in particular measured at a particular location at the wind turbine, such as at the wind turbine tower, at the nacelle of the wind turbine, at the hub of the wind turbine, or at a rotor blade of the wind turbine. The measuring the vibration quantity may comprise measuring the vibration quantity over a certain time period, such as by sampling the vibration quantity at particular time steps. The measuring the vibration quantity may comprise measuring the vibration quantity by an analogue device and/or digital device. The measuring the vibration quantity may comprise sensing and/or detecting and/or acquiring and/or transforming the vibration quantity using an appropriate sensor being responsive to an acceleration, deflection, movement, or oscillation of the wind turbine, in particular the nacelle of the wind turbine. In particular, the vibration of the wind turbine may occur along different directions, wherein the vibration of the wind turbine in the different directions may be measured using one or more sensors which may in particular output signals representing the vibration of the wind turbine along these different directions. Further, the measuring the vibration quantity may be more suited for detecting a mass change if it is filtered, in particular it may be preferable to use the averaged value.

The measuring the azimuthal quantity may comprise measuring an orientation of the rotor blade in the azimuthal direction (such as the cylinder coordinate $\phi$, when the z-axis of the cylinder coordinate system is aligned with the rotation axis of the rotor shaft at which (in particular via a hub) the rotor blade or rotor blades are connected). Thereby, the cylinder coordinate $\phi$ may represent the rotation angle of the blade. However, also any other angle obtained by shifting the angle $\phi$ may be used for representing the rotation angle of the blade. Further, the angle may be represented in any suitable unit, such as degree or rad. Further, the azimuthal quantity may be a trigonometric function of an angle representative of the rotation angle of the blade. The azimuthal quantity may for example be measured using an accelerometer that is rotating. Alternatively, the azimuthal quantity may be measured using a code wheel on the rotor shaft or on the hub.

The frequency quantity representative of a vibration frequency of the blade may for example be a number of oscillations per time of the blade edge. In particular, the blade may oscillate according to a combination of oscillation modes, wherein the frequency quantity representative of the vibration frequency of the blade may comprise or may be that frequency of the blade which has the largest amplitude. Thus, the frequency quantity associated with the blade may be representative for a ground frequency of the blade. In particular the blade may not comprise the sensor from which the vibration quantity representative of the vibration of the wind turbine is supplied. Thus, the vibration quantity measured at a location spaced apart from the blade may represent a vibration or a number of vibration modes of the entire wind turbine or of at least all rotor blades connected to the rotor shaft. In particular, the vibration quantity representative of the vibration of the wind turbine may be a superposition of vibrations of the individual rotor blades (such as 2, 3, 5, 7 or more rotor blades connected to the rotor shaft).

In order to extract from the vibration quantity the contribution related to the particular blade it may be necessary to use the azimuthal quantity and to compute or calculate the frequency quantity representative of the vibration frequency of the blade from both the vibration quantity and the azimuthal quantity. In particular, the frequency quantity may represent a ground frequency of a vibration of the blade, in particular the blade edge. The blade edge may be a leading edge (facing the wind direction) or a trailing edge (pointing in the wind direction). The actual vibration of the blade may comprise a complex pattern of vibration modes along different directions of the blade, such as along the longitudinal direction, along the transverse direction and along a direction in between the longitudinal direction and the transverse direction. In particular, the frequency quantity may represent a ground frequency of a main oscillation (having a maximal amplitude).

In particular, the frequency quantity may depend on a mass and/or a mass distribution of the blade. In particular, the frequency may be the lower the higher the mass of the blade is. Thus, a frequency change of the blade may indicate that a mass change at the blade occurred. The mass change may indicate that material was attached or added to the blade or that material was removed from the blade. In particular, the material attached to the blade or removed from the blade may comprise soil, dust, water, ice, or a mechanical component, such as a bolt, or any other material. In particular, upon determining the frequency quantity it may be determined that a mass change occurred which may then be indicated, such as by an electric signal, such as a voltage signal, a current signal, a light signal or any other type of signal. The indication that a mass change occurred may be delivered or supplied to a control system of the wind turbine which then may take into account the indication that a mass change occurred for appropriately adjusting an operation mode of the wind turbine. Thereby, the operation mode of the wind turbine may be refined or optimized with respect to the mass change at the blade which may in particular comprise eliminating the mass change at the blade by removing the added mass or depositing missing mass at the blade such as to re-establish the original mass of the blade.

In particular, the mass change may involve changing an aerodynamic profile of the blade which may adversely affect the performance of the wind turbine. In particular, the mass change may result from icing (formation of water ice) at the blade, in particular at the blade edge, may involve changing the profile of the leading edge and/or the trailing edge of the blade. Thereby, the airflow along the leading edge and the trailing edge of the blade may be adversely altered such that the driving power of the blade is reduced.

Determining that a mass change at the blade occurred or/and indicating that a mass change occurred allows to perform measures to remedy the problem, to re-establish the intended performance of the wind turbine, in particular the performance of the blade.

According to an embodiment the determining the frequency quantity is further based on a temperature of the wind turbine, wherein in particular the frequency quantity is linearly dependent on the temperature of the wind turbine.

In particular, the vibration quantity may represent a vibration or oscillation having a particular frequency or frequency spectrum. The frequency quantity may in particular depend on the (measured) temperature of the wind turbine or the blade(s). Thus, the frequency f' measured at a temperature T may depend on the frequency f at a reference temperature (such as 20° C.) and may depend linearly on the temperature T according to the equation $$f'=f+C1*(T-T')+C2$$

Thereby C1 is a temperature compensation constant and C2 is a mean frequency compensation constant. The change of the frequency due to changing temperature may be taken into account, in order to detect a mass change from the frequency change. Thereby the determination of the frequency quantity may be more accurate.

According to an embodiment the determining the mass change comprises comparing the frequency quantity with a predetermined reference frequency or a temperature dependent reference frequency. The reference frequency (or the kind (or parameters) of a dependency of the temperature dependent reference frequency from the temperature, such as a linear dependency) may be stored in a controller system of the wind turbine and may be based on initial blade frequency measurements carried out just after installation of the wind turbine. Alternatively, the reference frequency of the blade may be selected from a pre-programmed or stored table in the controller system listing frequencies of blades of different types and sizes. Further, the reference frequency may be selected as an average of the frequency of all blades comprised in the wind turbine. In particular, the wind turbine may comprise 2, 3, 4, 5, 7 or even more blades connected to a common hub which in turn is connected to the rotor shaft which in turn drives an electric generator for generating electric energy.

According to an embodiment the mass change is determined (or it is determined that the mass change occurred), if the frequency quantity deviates from the predetermined reference frequency by a predetermined threshold which in particular depends on a stiffness and/or a weight of the blade, wherein the threshold amounts in particular to between 10 mHz and 100 mHz, more in particular to between 30 Hz and 70 Hz. In particular, the threshold may amount to around 50 mHz. The threshold may depend on the blade specification, wherein the higher the stiffness of the blade the lower the threshold may be and wherein the larger the weight the lower the threshold may be. Thereby, a simple criterion may be provided from which it can be decided or determined, if a mass change occurred, in particular if icing at the blade occurred.

According to an embodiment the mass change is (is determined as) a mass increase, if the frequency quantity is smaller than the predetermined reference frequency, in particular by at least the predetermined threshold. Thereby, a simple criterion is provided to determine whether the mass of the blade increase, in particular whether icing at the blade occurred.

According to an embodiment the measuring the vibration quantity comprises measuring the vibration quantity using an accelerometer which is in particular arranged at a nacelle of the wind turbine. Thereby, a sensor or any other measuring device may be avoided at the blade which would otherwise be difficult to be installed at the blade and which would be exposed to external conditions which could damage the sensor. Thereby, a reliability and/or durability of the determination method and/or the equipment used for the method may be improved.

According to an embodiment the measuring the vibration quantity comprises measuring the vibration quantity in at least one direction in a rotation plane of the blade. In particular, the vibration quantity may be measured along the horizontal direction and/or along the vertical direction, wherein the vertical direction extends along a longitudinal direction of the tower of the wind turbine. Thereby, the accuracy and reliability of the determination method may be improved.

According to an embodiment the determining the frequency quantity comprises multiplying a trigonometric function of a term related to the azimuthal quantity with the vibration quantity. The term related to the azimuthal quantity may be the azimuthal quantity itself or for example a sum of the azimuthal quantity and an offset angle quantity. The trigonometric function may comprise for example the sine-function or the cosine-function. The multiplying may help to extract the frequency quantity of that blade for which it is intended to determine, whether there is a mass change. In particular, the multiplying may aid to extract that portion of the vibration quantity that relates to the blade. Thereby, the determining the frequency quantity may be performed in a simple way which may be easily implemented for example in a computer program.

According to an embodiment the determining the frequency quantity comprises performing a frequency analysis of the vibration quantity. In particular, a Fourier transformation may be applied for determining individual frequencies comprised in the vibration quantity which may represent a superposition of several oscillations having different frequencies. One of this oscillation may relate to a ground oscillation of the blade for which it is intended to determine, whether a mass change occurred.

According to an embodiment the method for determining a mass change at a rotating blade of a wind turbine further comprises indicating an icing at the blade, if the mass change is determined or if it is determined that a mass change occurred. Thereby, the indicating may comprise generating a signal, such as an electric signal, a light signal or any other kind of signal which may in particular trigger a measure to remedy the problem. The indicating the icing at the blade may alternatively or additionally comprise a signal delivered to a monitoring system to be recognized by maintenance personnel.

According to an embodiment the determining the icing is further based on a measured meteorological quantity, in particular a temperature and/or a humidity. Thereby, the reliability and/or accuracy of the indication that icing occurred may be improved. In particular, the indicating the icing may be performed, if the temperature is below a threshold temperature (such as around 0°) and/or the humidity is above a threshold humidity.

According to an embodiment a method for operating a wind turbine is provided, wherein the method comprises rotating a blade according to a first operation mode; determining a mass change at the rotating blade according to an embodiment as described above; and changing the operation mode to a second operation mode, if it is determined that the mass change occurred. Thereby, the operation mode of the wind turbine may be changed taking into account that a mass change took place, thus enabling operating the wind turbine at an operation mode appropriate for the state, in particular for the mass, of the blade. Thereby, in particular, the second operation mode may comprise taking a measure to reverse the mass change determined at the blade, in order to re-establish the original mass, or original state, of the blade. In other embodiments, the mass change of the blade may not be reversed but other operational parameters of the wind turbine, such as rotor speed, turbine orientation, in particular nacelle orientation, may be changed.

According to an embodiment the second operation mode comprises operating a deicing system for deicing the rotor blade. The deicing system may for example comprise one or more piezoelectric elements arranged or mounted at the rotor blade which may be activated or operated to remove the ice attached to the rotor blade, in particular attached to an edge of the rotor blade. Thereby, the piezoelectric elements may be activated to vibrate in order to destroy the ice or crack the ice or release the attached ice from the blade surface. In other embodiments, the deicing system may alternatively or additionally comprise a heating system for heating at least a portion of the blade. According to an embodiment the deicing system may be activated, started or stopped depending on the determination whether a mass change occurred. In particular, after operating the deicing system for a certain time period it may be determined that the original mass of the blade is re-established (due to the removing the ice from the blade). Thereupon, the deicing system may be stopped and the wind turbine may resume, controlled by a control system, the operation in the first operation mode. Thereby, an efficiency of the wind turbine may be improved, since a time in the first operation mode (in particular the normal operation mode) may be prolonged.

According to an embodiment the second operation mode comprises stopping the rotating the blade. In particular, if it is determined that a mass change, in particular a mass increase, above a mass threshold has occurred, the stopping the rotating the blade may be necessary, to restore an efficiency of the wind turbine.

According to an embodiment a system for determining a mass change at a rotating blade of a wind turbine is provided, wherein the system comprises a vibration sensor for measuring a vibration quantity representative of a vibration of the wind turbine; a angle sensor for measuring an azimuthal quantity representative of a rotation angle of the blade; and a processing apparatus for determining a frequency quantity representative of a vibration frequency of the blade from the vibration quantity and the azimuthal quantity, and for determining the mass change at the blade based on the frequency quantity.

The skilled person will understand that features (individual or in combination) disclosed with respect to the method for determining a mass change at a rotating blade of a wind turbine may also be applied (individually or in any combination) to the system for determining a mass change at a rotating blade of a wind turbine.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1:
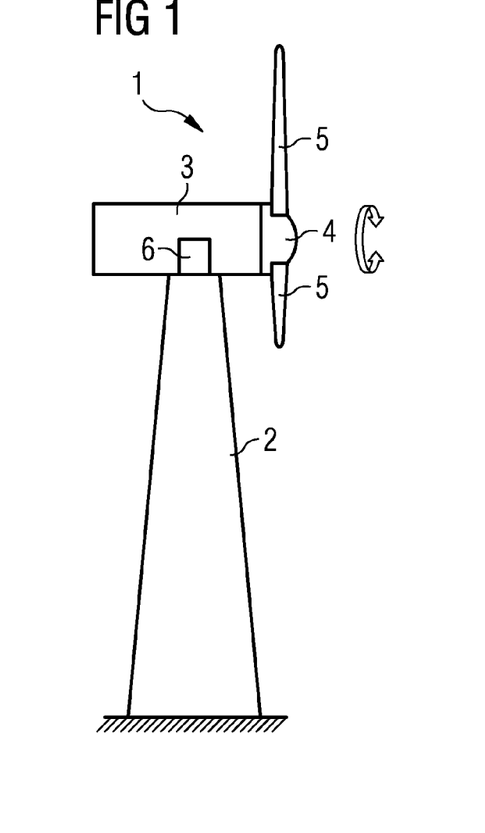
FIG. 1 schematically illustrates a side view of a wind turbine including a system for determining a mass change at a rotor blade of the wind turbine according to an embodiment.
Figure 2:
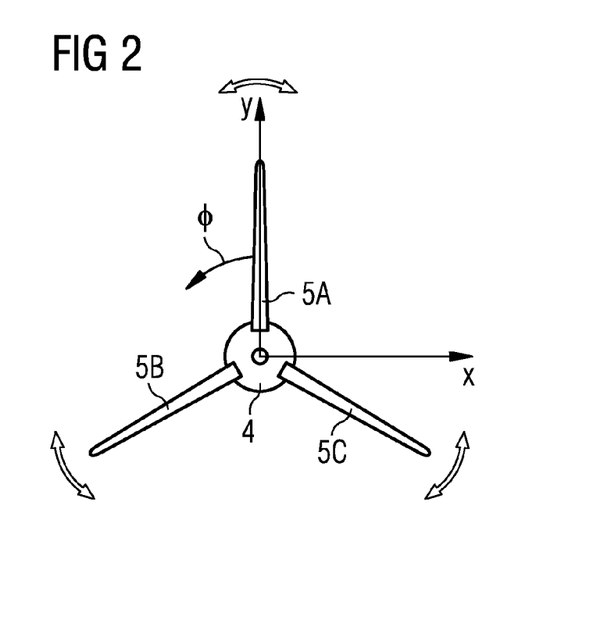
FIG. 2 schematically illustrates a front view of the hub including the blades of the wind turbine illustrated in FIG. 1.

The monitoring system is build into a wind turbine 1 as shown in FIGS. 1 and 2 comprising a tower 2, a nacelle 3, a hub 4 and one or more rotating blades 5. The monitoring system consists of an accelerometer 6 (also called a G-sensor) with a built-in controller or calculator (not shown) placed in the nacelle 3 for sensing vibrations of the nacelle 3 originating from the vibrations of each rotating blade 5. The G-sensor senses the vibrations in two directions, transverse the nacelle (x-direction) and along the nacelle (y-direction), as defined in FIG. 2. As the G-sensor 6 with the built-in controller or calculator is placed in the nacelle 3 on top of the tower 2, it is obvious that the G-sensor senses the frequencies of all the blades through the vibrations of the tower 2. To extract each blade frequency the rotating angle (azimuth angle) Φ of the rotating blades is used by the monitoring system. The rotating azimuth angle Φ is sensed by using a sensor (not shown) which is normally used for the pitch control, which is a common control system of a wind turbine.

According to an embodiment it is hereby possible to use only one G-sensor 6 placed in the nacelle 3 of a wind turbine 1 to monitor each blade frequency and to determine, whether a mass change occurred, in particular due to icing at the blade. According to an embodiment a method disclosed in WO2009/000787 is utilized to determine a blade edge frequency.

As mentioned above, this is done by also using the azimuth angle sensor for sensing the rotating angle position (azimuth angle) Φ of the blades 5 (A, B and C), and by using the cosine values of the azimuth angle Φ multiplied with the frequencies in the x-direction monitored by the G-sensor 6 in the nacelle 3 (modulation). By using the cosine values of the azimuth angle Φ primarily the vibrations in the x-direction of each blade is monitored. This is done with basis in the theory that the frequencies of the blade edge (in the x-direction) have the largest influence on the nacelle with the G-sensor 6, when the blades 5 are in a vertical position (0 or 180 degrees) and almost no influence in the horizontal position (90 or 270 degrees). By using the frequencies corresponding to a displacement of the blades 5 of respectively 0 degrees, 120 degrees and 240 degrees (in a typical three bladed wind turbine), and applying a Fast Fourier Transformation (FFT) to the modulated G-sensor signals, the frequencies of each blade 5 is monitored.

Alternatively the measured frequencies from the G-sensor Φ in the y-direction (along the nacelle) are used to calculate each blade frequency. Then it is not suitable to use the cosine values of the azimuth angle Φ, as the blades vibrate in the y-direction during the whole 360 degree of rotation. But as the moment load of the tower is larger in the top vertical position of the blades than in the bottom vertical position of the blades, it would be suitable to multiply the sensed frequencies with a function simulating these circumstances, like a constant number (e.g. number 1) added to the cosine value of the azimuth angle Φ and then dividing this number with 2 ((1+cosinus (azimuth angle Φ))/2). This function gives a number between 1 and 0 in the range of 0 and 360 degrees, and thereby extracting each blade frequency as further described above.

The controller or calculating unit which has input from the sensed signals from the G-sensor 6 and the azimuth angle Φ comprises a modulation unit which modulates the sensed signals, a Fast Fourier Transformation (FFT or DFFT) unit or a Phase Locked Loop oscillation (PPL) unit which extracts each blade frequency from the modulated signals, and further an alarm unit which sets an alarm and/or stops the wind turbine when the change of each blade frequency reaches a certain level. All these units in the controller are not shown.

Looking only at vibrations due to the edgewise resonance frequency, the blade edgewise accelerations for each blade (A, B and C) can be described as the formula below:

$$a_A(t) = k \cdot \cos(\omega_A \cdot t)$$

$$a_B(t) = k \cdot \cos(\omega_B \cdot t)$$

$$a_C(t) = k \cdot \cos(\omega_C \cdot t)$$

Where a(t) is the blade acceleration edgewise, ω is the edge wise resonance frequency, t is the time and k is a constant.

Figure 3:
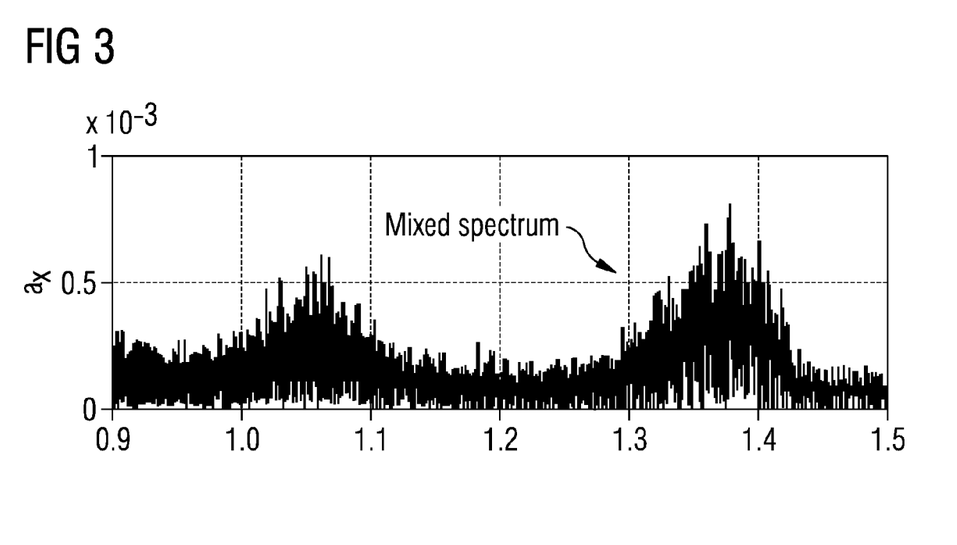
FIG. 3 illustrates a graph showing a trace of a vibration quantity used in a method according to an embodiment.

The edge vibrations in the blade are coupled into the nacelle with a Ip modulation (once per revolution modulation). Assuming that the blade edge vibrations couple most with the nacelle, when the blades have a vertical position (as earlier described), the nacelle vibrations can approximately be described by:

$$a_X(t, \phi) = \left( a_A(t) \cdot \cos(\phi) + a_B(t) \cdot \cos\left(\phi - \frac{2 \cdot \pi}{3}\right) + a_C(t) \cdot \cos\left(\phi - \frac{4 \cdot \pi}{3}\right) \right) \cdot k_2$$

Where ax(t,Φ) is the nacelle acceleration, aA is the blade A acceleration edgewise, aB is the blade B acceleration edgewise, ac is the blade C acceleration edgewise, Φ is the rotor azimuth angle and k2 is a constant. A frequency spectrum of ax is depicted in FIG. 3 comprising a superposition of a number of frequencies having different amplitudes originating from different blades 5.

Modulation of the ax signal again with respect to the individual blade position gives 3 new signals defined by:

$$am_A = a_X \cdot \cos(\phi)$$

$$am_B = a_X \cdot \cos\left(\phi - \frac{2 \cdot \pi}{3}\right)$$

$$am_C = a_X \cdot \cos\left(\phi - \frac{4 \cdot \pi}{3}\right)$$

Figure 4:
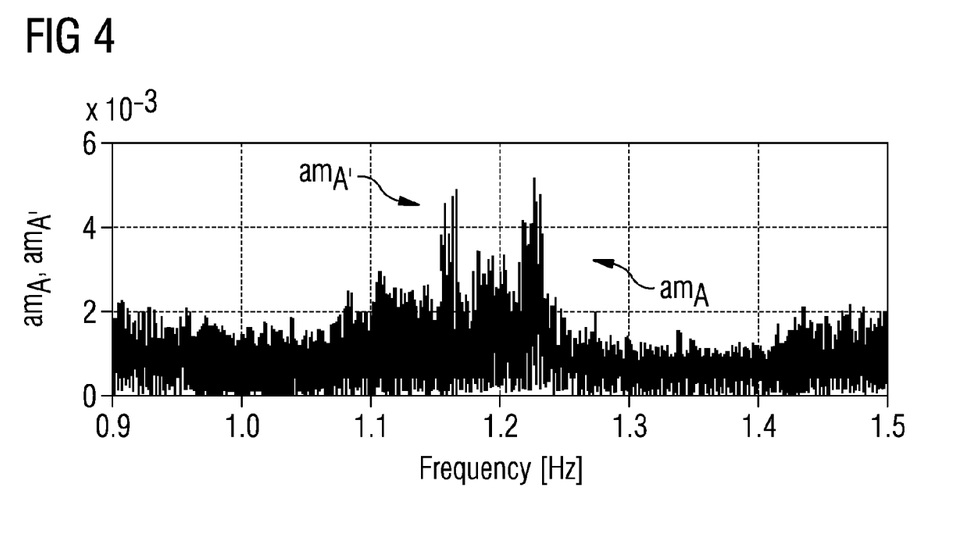
FIG. 4 illustrates a graph showing a frequency quantity relating to a blade having different masses attached, wherein the data are derived from the vibration quantity depicted in FIG. 3.

FIG. 4 shows the frequency spectrum of the blade A, as the blade is in its original condition ($am_A$) (having the original mass of the blade A) as superimposed with the frequency distribution of the blade A in an icing condition or state ($am_A'$) (where ice is formed on and attached at the blade A). The two frequency distributions are only superimposed in the plot illustrated in FIG. 4 in order to illustrate the shift or change in the frequency of the blade A in the normal condition and in the icing condition. As it can be observed the main frequencies (frequencies having the largest amplitudes) of the blade A in the normal condition (i.e. having the original mass of the blade A) labelled by $am_A$ lie at around 1.24 Hz, while the main frequencies (these frequencies having the largest amplitudes) of the blade A in the icing state (having ice on a surface of the blade A such that its mass is increased relative to the original mass) lie at around 1.17 Hz. Thus, the frequencies of the blade A in the icing state have dropped relative to the frequencies in the normal state by 70 mHz-80 mHz. By the method according to an embodiment this drop of the frequencies may easily be detected. Also the frequencies may depend (in particular in a linear manner) on the temperature of the wind turbine, in particular the blade. Thereby, the frequencies in the normal condition and in the iced state may not be constant but may ly between 1.17 Hz and 0.0005 Hz depending on the temperature of the wind turbine, in particular the blade(s). Thereby the temperature dependency may be taken into account when determining (using a frequency change) a mass change at the blade(s) due to ice formation.

Figure 5:
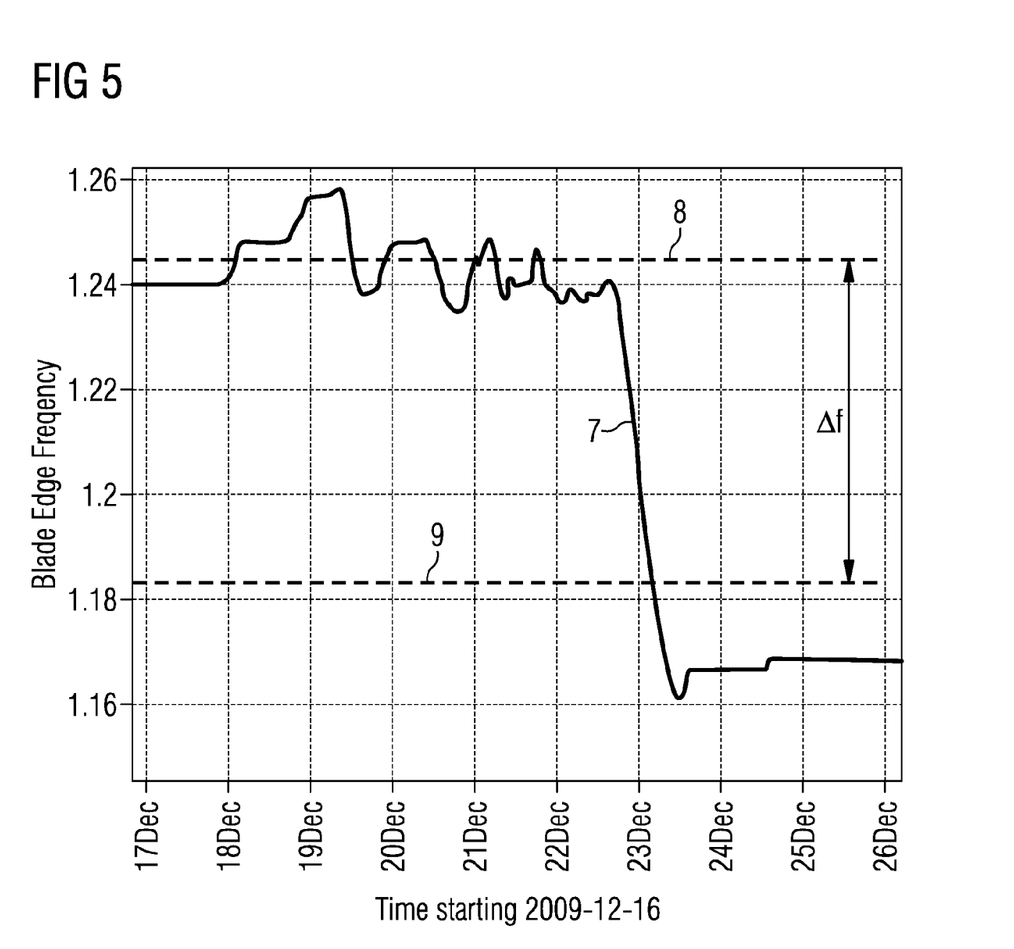
FIG. 5 illustrates a graph of a time course of the edge frequency of one blade, the data in the graph being used for determining a mass change at the rotating blade according to an embodiment of a method.

FIG. 5 illustrates a graph showing a time course of the blade edge frequency of blade A during December 2009 by a curve 7. From December 18-December 22 the blade edge frequency amounts to in between 1.26 and 1.23 Hz, whereas at December 23 a drop of the frequency to a value below 1.17 is observed within 24 hours. After December 23 the frequency remains within a range between 1.16 and 1.17. The drop of the frequency of the blade A may indicate that ice is forming on or is attached to the blade A. This icing condition may adversely affect the performance of the rotor blade A due for example to an alteration of the airfoil profile of the blade A.

The drop of the blade edge frequency 7 illustrated in FIG. 5 may trigger to set the wind turbine 1 in a different operation mode. For example, a deicing system mounted in the blade 5A may be activated for melting/removing the ice. In another embodiment the ice detection method may trigger to stop the turbine, when ice is detected by the drop of the blade edge frequency.

In some weather conditions ice may be built up on the blade or blades of the wind turbine with the consequence that the turbine produces significant less power. According to an embodiment the wind turbine is equipped with a deicing system that can remove the ice from the blade or blades. For such a turbine the "ice on the blades condition" (icing condition) must be detected using the detection method as described above. Further, the method for determining a mass change at a blade may be used to explain a performance or power curve of the blade and may be used to forecast the expected power production of the wind turbine. According to an embodiment an additional sensor located at the blade can be avoided, thus simplifying the construction of the wind turbine. According to an embodiment the blade 5A has a reference frequency of about 1.25 as indicated by the broken line 8 in FIG. 5. According to an embodiment the system or the method indicates that icing occurred at the blade 5A, if the drop of the frequency of the blade 5A from the reference frequency 8 is larger than the threshold $\Delta f$. $\Delta f$ may depend on the physical constitution of the blade, such as on its stiffness and/or on its weight. Thereby, if the frequency of the blade 5A drops below the threshold 9 indicated in FIG. 5, the method or the system for determining the mass change (or indicating the icing condition) may indicate that icing at the blade 5A occurred.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

1 Wind turbine
2 Wind turbine tower
3 Nacelle
4 Hub
5,5A,5B,5C Blade of the wind turbine
6 Accelerometer
7 Blade edge frequency time course
8 Reference frequency
9 Frequency threshold

The invention claimed is:
1. A method for determining a mass change at a rotating blade of a wind turbine, the method comprising:
    measuring a vibration quantity representative of a vibration of the wind turbine;
    measuring an azimuthal quantity representative of a rotation angle of the blade;
    determining a frequency quantity representative of a vibration frequency of the blade from the vibration quantity and the azimuthal quantity; and
    determining the mass change at the blade based on the frequency quantity,
    wherein the determining the mass change comprises comparing the frequency quantity with a predetermined reference frequency, and
    wherein the determining the frequency quantity comprises multiplying a trigonometric function of a term related to the azimuthal quantity with the vibration quantity.
2. The method according to claim 1, wherein the determining the frequency quantity is further based on a temperature of the wind turbine.
3. The method according to claim 2, wherein the frequency quantity is linearly dependent on the temperature of the wind turbine.
4. The method according to claim 1, wherein the determining the mass change comprises comparing the frequency quantity with a predetermined reference frequency or a temperature dependent reference frequency.
5. The method according to claim 1, wherein the measuring the vibration quantity comprises measuring the vibration quantity using an accelerometer, arranged at a nacelle of the wind turbine.

6. The method according to claim 1, wherein the measuring the vibration quantity comprises measuring the vibration quantity in at least one direction in a rotation plane of the blade.

7. The method according to claim 1, wherein the determining the frequency quantity comprises performing a frequency analysis of the vibration quantity.

8. The method according to claim 1, further comprising indicating an icing at the blade when the mass change is determined.

9. The method according to claim 8, wherein the indicating the icing is further based on a measured meteorological quantity.

10. The method according to claim 9, wherein the meteorological quantity is a temperature and/or a humidity.

11. A method for operating a wind turbine, the method comprising:
   rotating a blade according to a first operation mode;
   determining a mass change at the rotating blade according to the method according to claim 1; and
   changing the operation mode to a second operation mode, when the mass change has been determined.

12. The method according to claim 11, wherein the second operation mode comprises operating a deicing system for deicing the rotor blade.

13. The method according to claim 11, wherein the second operation mode comprises stopping the rotating the blade.

14. A method for determining a mass change at a rotating blade of a wind turbine, the method comprising:
   measuring a vibration quantity representative of a vibration of the wind turbine;
   measuring an azimuthal quantity representative of a rotation angle of the blade;
   determining a frequency quantity representative of a vibration frequency of the blade from the vibration quantity and the azimuthal quantity; and
   determining the mass change at the blade based on the frequency quantity,
   wherein the determining the mass change comprises comparing the frequency quantity with a predetermined reference frequency or a temperature dependent reference frequency,
   wherein the mass change is determined when the frequency quantity deviates from the reference frequency by a predetermined threshold which depends on a stiffness and/or a weight of the blade, and
   wherein the predetermined threshold is between 10 mHz and 100 mHz.

15. The method according to claim 14, wherein when the frequency quantity is smaller than the predetermined reference frequency by at least the predetermined threshold, the mass change is a mass increase.

16. A method for determining a mass change at a rotating blade of a wind turbine, the method comprising:
   measuring a vibration quantity representative of a vibration of the wind turbine;
   measuring an azimuthal quantity representative of a rotation angle of the blade;
   determining a frequency quantity representative of a vibration frequency of the blade from the vibration quantity and the azimuthal quantity; and
   determining the mass change at the blade based on the frequency quantity,
   wherein the determining the frequency quantity comprises multiplying a trigonometric function of a term related to the azimuthal quantity with the vibration quantity.

* * * * *